Patented Mar. 17, 1953

2,632,006

UNITED STATES PATENT OFFICE 2,632,006

RAPID BASIC-CATALYZED ESTERIFICATION OF CELLULOSE

Roe Calvin Blume, Waynesboro, Va., assignor to E. I. du Pont de Nemours and Company, Wilmington, Del., a corporation of Delaware No Drawing. Application May 5, 1951,
Serial No. 224,829

11 Claims. (Cl. 260—227)

This invention relates to an improved process for the manufacture of cellulose esters of organic carboxylic acids and, more particularly, to the rapid acetylation of cellulose in the presence of both a basic catalyst and an organic activator.

It is well known that by treating natural or regenerated cellulose with anhydrides of carboxylic acids or with ketene as acylating agents in the presence of either acidic or basic catalysts there may be obtained, with retention of the structure of the cellulosic materials, esters of cellulose which have limited solubility characteristics. In additon to employing catalysts, such as sulfuric acid or potassium acetate, an organic acid diluent or solvent for the cellulose ester being formed is usually included. The fully esterified cellulose triester produced is ofttimes obtained in the form of a viscous homogeneous solution in the organic acid diluent employed. Water may then be added to this primary cellulose ester in an amount sufficient to convert any organic acid anhydride remaining to the corresponding acid. The fully esterified primary cellulose ester, usually after the addition of a further quantity of water to the viscous solution obtained, is permitted to hydrolyze or saponify in solution from the primary cellulose triester to a secondary cellulose ester of a lower degree of esterification having the desired solubility characteristics. During saponification some of the acyl groups are split off and combined sulfuric acid is partially removed in the event of acid-catalyzed acetylation. Water and/or other non-solvents for the cellulose ester are then added in sufficient amounts to precipitate the hydrolyzed cellulose ester from solution. The precipitated secondary cellulose ester is washed with water to remove as much acid and other non-cellulosic ester materials, including sulfur compounds, as possible and the ester is then subjected to a stabilizing treatment with the object of still further reducing its content of combined sulfuric acid, since any combined sulfuric acid remaining imparts to the cellulose ester a tendency to decompose, degrade and/or discolor.

In order to avoid some of the drawbacks inherent with the acid-catalyzed esterification of cellulose and to simplify the entire operation, it has been thought advisable to carry out the esterification with the carboxylic acid anhydride in the presence of a basic catalyst, such as potassium or sodium acetate. Among the basic catalysts used for anhydride esterification other than the salts of inorganic acids is pyridine. The prior art contains numerous references to esterifications, particularly the acetylation of cellulose, with pyridine as a solvent medium. It is a generally accepted belief that the pyridine does not act primarily as a true catalyst, but rather forms salts with the acetic acid formed during the acetylation process. The acetylation in the presence of pyridine alone is reputed to be a slow heterogeneous process producing an insoluble product which is undegraded. It has been reported that to obtain a cellulose acetate of 61.50% combined acetic acid content using pyridine as a "solvent-catalyst" requires over forty days when the reaction is carried out at 55° C.

Although it is true that the basic-catalyzed esterification of cellulose may be accelerated by pretreatment of the cellulosic material prior to esterification, it is preferable that a process be developed whereby the cellulose or cellulosic materials need not be activated prior to esterification. As is well known to those skilled in the art, cellulosic materials prior to any esterification pretreatment have varying degrees of reactivity to chemical reagents, depending on various factors, such as the source of the cellulose and the particular isolating and purifying methods used. Since some of the requisites of a commercially profitable process are simplicity of operation, minimum of steps and universal operativeness despite source material variations, the currently available basic catalytic processes leave much to be desired.

It is an object of this invention to prepare organic acid esters of cellulose of improved stability. Another object is the provision of a method for the preparation of cellulosic esters in a rapid manner in which the resulting product is free of degrading impurities. A still further object is the production of cellulose acetate of improved stability using basic catalytic materials in conjunction with organic compounds having an activating and/or accelerating effect on the acetylation reaction. A still further object is the provision of a process for the rapid chemical modification of cellulose capable of operating over a wide range of catalytic concentrations and anhydride-solvent compositions without the necessity of pretreatment of the cellulose. Other objects appear hereinafter.

The objects of this invention are accomplished by esterifying cellulose with an acylating agent in the presence of an inorganic salt as catalyst together with an organic activator which is a lactone selected from the group consisting of gamma-butyrolactone and gamma-valerolactone. More particularly, the invention is based on the surprising observation that when cellulose is acetylated in the presence of both potassium acetate and gamma-butyrolactone or gamma-valerolactone, cellulose acetate of improved stability is prepared in a very short period without degradation. For convenience, reference is made to the inorganic salt such as potassium acetate or other potassium salt, as a catalyst and the lactone is referred to as an activator. While the esterification media are acidic, the catalyst is a basic material. It is essential that the basic catalyst and the organic activator both are present for the beneficial results described more fully hereinafter.

The invention is illustrated in greater detail by the following examples, in which, for convenience, the degree of esterification is measured in terms of "per cent combined acetic acid" where 62.5% combined acetic acid represents the cellulose triacetate stage. These examples, of course, are not to be considered as limiting the invention in any way.

Example I

Five grams of cotton linters cellulose was refluxed for one hour with a mixture of 2.5 grams of potassium acetate, 75 cc. acetic anhydride and 75 cc. of gamma-butyrolactone. The sample became highly swollen and transparent and was dispersed in the reaction mixture. The product was isolated by quenching the reaction mixture in cold water followed by washing free of acid and lactone by using fresh water. The combined acetic acid content of the product is 53.8%. This indicates a high degree of effectiveness, since 62.5% combined acetic acid represents the cellulose triacetate stage.

Example II

In a similar experiment, the gamma-butyrolactone was replaced by an equal amount of gamma-valerolactone. The reaction proceeded as in Example I. The ester was isolated as in Example I and it analyzed for a combined acetic acid content of 50.7%.

Generally, if an excess of anhydride is not used, more potassium salt and more lactone will be required, the amounts increasing as the anhydride amounts decrease. Usually, it is preferred to use equal amounts of anhydride and lactone although the amount of lactone can be varied; for example, it can be from about 100% to about 600% of the weight of the anhydride being used. The potassium salt is normally used in amounts from about 20% to about 100% based on the weight of the cellulose being acylated.

While the new invention has been described above with reference to the acetylation of cellulose, it is to be realized that this was done for convenience sake only, for the process hereinafter claimed may be applied to the esterification of cellulose broadly, for example, to produce lower fatty acid esters of cellulose, such as cellulose propionate, cellulose butyrate and the like. That is, many anhydrides may be used to produce esters, such as acetic, propionic, butyric, valeric, isovaleric, benzoic and chloroacetic acid anhydrides. Mixed esters may also be produced, for example, by using a mixture of appropriate anhydrides in the presence of the basic catalyst and organic activator.

Previously cellulose mixed esters were prepared by the direct method, generally by modification of commercial acetate processes in which certain quantities of higher anhydride were substituted for part of the acetic anhydride. These methods were deficient in that it was impossible to obtain consistently high degrees of polymerization, and in some cases it was impossible to introduce the higher acyl group (above butyryl) simultaneously with acetyl. With this invention, however, mixed triesters of a high degree of polymerization (330-360 or higher) can be prepared by basic catalyzed acylation, starting with an ordinary acetone soluble cellulose acetate. A partial acetate is treated with the higher anhydrides at temperatures from 40-166° C. for 1 to 6 hours with concentrations of 0.5 to 15% base as potassium hydroxide. This, of course, reacts with the anhydride to form the corresponding potassium salt of the acid which is the real catalyst. The lactones of this invention are very effective for replacing part of the higher anyhydride. However, when dimethoxytetraglycol, propionic acid, or glycoldiethylether were used, the rate of reaction was adversely affected.

None of the acetyl groups already on the glucose residue was replaced by the higher acyl groups during this basic catalyzed acylation. This means that by controlling the starting material, it is possible to control precisely the composition of the final triester; and since basic catalyzed acylation does not degrade cellulose, the degree of polymerization of the final product is just as high as that of the starting material.

Mixed triesters have the advantage over commerical cellulose acetate of being more resistant to wet ironing and of possessing a higher wet initial modulus. Further, most of these mixed tri-esters are acetone soluble so that they may be converted readily, e. g., by the dry-spinning process, into useful shaped articles.

As in the production of unmixed esters, the anhydrides used can be varied widely and include propionic, butyric, isobutyric, trimethylacetic, crotonic, 2-ethylbutyric, nonanoic, and benzoic anhydrides.

Potassium acetate has been referred to as the preferred catalyst present during the acetylation and during the subsequent saponification. Other metallic acetates may be employed, although their catalytic powers are definitely inferior to the potassium salt. For example, calcium, barium, magnesium, lithium, aluminum and ammonium acetates are ineffective. Sodium acetate is somewhat effective but is inferior to potassium acetate. Moreover, other salts of potassium besides the acetate are reasonably effective, such as potassium formate, potassium fluoride, potassium propionate, potassium carbonate and potassium chloride. Use of such salts as those in the above specific examples instead of potassium acetate yields similar results. Potassium salts, in general, are effective, but potassium acetate is the most effective and cheapest agent.

The cellulosic material used in the practice of this invention can be any of the common types of cellulose, such as cotton, wood pulp, regenerated cellulose, and the partially substituted cellulose derivatives, such as methyl cellulose, ethyl cellulose, hydroxyethyl cellulose, benzyl cellulose and the like having substantial proportions of free hydroxyl groups. Any pretreatment of the cellulose may be used but it is not at all necessary that the cellulosic material be activated prior to esterification. The process may be stopped at any desired intermediate degree of combined acetic acid depending upon the use to which the cellulose ester is going to be put.

High combined acetic acid values may be achieved under widely varying conditions as indicated from some of the above examples in respect to the type of cellulose acetylated, nature of pretreatment, if any, concentration of reactants and length of time allowed for the reaction.

While the time required for substantially full esterification or otherwise modifying the cellulose of this invention is usually less than one hour, it depends on the particular anhydride or reactant, the temperature of the esterifying or reaction mixture, and on the particular organic activator and basic catalyst that are employed. It is preferred that the reaction be carried out at a reasonably high temperature, i. e., the reflux temperature of acetic anhydride, but it may be performed satisfactorily at lower temperatures. Temperatures of about 100° C. to about 200° C. are usually employed in the process of this invention. In the preparation of the acetate ester the maximum degree of esterification is usually reached in about one hour at 140° C. by the process of this invention. This extent of reaction (55 per cent combined acetic acid) is reached only after 24 hours if the organic activator is omitted from the system.

Certain organic compounds have been found which when combined jointly with potassium acetate do not give the enhanced results that are obtained with the lactones of this invention. And, in fact, certain of them inhibit the acetate of cellulose by acid anhydride. For example, dioxane, acetic acid and benzene are not effective in the process of this invention.

Due to the insolubility of the triacetate in acetone, it becomes necessary to saponify or hydrolyze the cellulose triacetate to the useful acetone-soluble, secondary acetate by any of the well-known methods. A method of obtaining the secondary cellulose acetate in the desired combined acetic acid range is by catalyzing the acid saponification with potassium acetate. Not only is there less attendant degradation when the acetate salt is included but the hydrolysis is completed in less time. For example, by employing 100 grams of cellulose triacetate prepared in accordance to this invention, adding 1420 cc. of acetic acid, 80 cc. of water and 25 grams of potassium acetate, the product may be hydrolyzed to a 54.8% combined acetic acid content by refluxing for 18 hours in the mixer, precipitating, washing and drying and processing by the customary procedures. This product is acetone-soluble.

The present invention has many advantages, one of the best of which is the rapidity of the basic catalyzed reaction. In addition to those already mentioned, it may be pointed out that the volume of mixture being processed is reduced. Pretreatments may be avoided, and there is less likelihood that objectionable degradation of the original cellulose macromolecule will ocurr by acetolysis; that is, the splitting of anhydroglucose units from one another which usually occurs with acetic acid and with mineral acid catalysts.

As already indicated, the primary organic acid esters of cellulose produced in accordance with the present invention are well adapted for conversion to the corresponding secondary esters having properties rendering them especially efficacious for the production of plastic films, fibers, coating compositions and the like. The secondary esters derived from the primary esters are characterized by increased stability due to the absence of acidic material therein and are especially suitable for conversion to cellulose acetate yarn having tensile strength and elongation quite well within the range for commercial acetate yarn.

This invention is particularly advantageous because celluloses having high degrees of polymerization (DP), for example, from 600 to 1200 or more, can be successfully and rapidly acylated by the process of this invention. Celluloses having a DP of less than 600 can, of course, be esterified by the process of this invention. The prior art methods can be used on the low DP celluloses to effect rapid esterification but are inffective on celluloses of high DP. The process of this invention finds, therefore, particularly broad utility with the high DP celluloses coupled with broad utility with the lower DP celluloses.

The hydrolyses referred to above deal only with the cellulosic polymers having a DP less than about 500. Useful products are obtained from these by the attainment of acetone solubility. The esters prepared from celluloses having a DP above, say 500–600 are fibrous products and are not readily degraded to soluble products by hydrolysis. This property coupled with insolubility and their high decomposition points make the high DP esters useful in electrical insulation, fishing lines, nets, etc. and in many other applications where great resistance to the action of bacteria or fungi is required.

Any departure from the above description which conforms to the present invention is intended to be included within the scope of the claims.

I claim:

1. A process for the production of cellulose esters which comprises esterifying cellulose with an anhydride of a lower fatty acid in the presence of a potassium salt of a lower fatty acid as a catalyst and a lactone activator selected from the group consisting of gamma-butyrolactone and gamma-valerolactone.

2. A process in accordance with claim 1 in which the said lactone is gamma-butyrolactone.

3. A process in accordance with claim 1 in which the said lactone is gamma-valerolactone.

4. A process in accordance with claim 1 in which said salt is potassium acetate.

5. A process in accordance with claim 1 in which said salt is potassium acetate and said lactone is gamma-butyrolactone.

6. A process in accordance with claim 1 in which said salt is potassium acetate and said lactone is gamma-valerolactone.

7. A process in accordance with claim 1 in which said anhydride is acetic anhydride.

8. A process in accordance with claim 1 in which said esterification is conducted at the boiling point of said anhydride.

9. A process for the production of cellulose esters which comprises esterifying cellulose with an anhydride of a lower fatty acid in the presence of a potassium salt of a lower fatty acid as a catalyst present in amounts of about 20% to about 100% by weight of said cellulose and a lactone activator selected from the group consisting of gamma-butyrolactone and gamma-valerolactone.

10. A process in accordance with claim 9 in which said anhydride and said lactone are present in equal amounts.

11. A process in accordance with claim 9 in which said anhydride is present in an amount equal to twice the theoretical quantity required for complete esterification.

ROE CALVIN BLUME.

No references cited.